Figure 1:
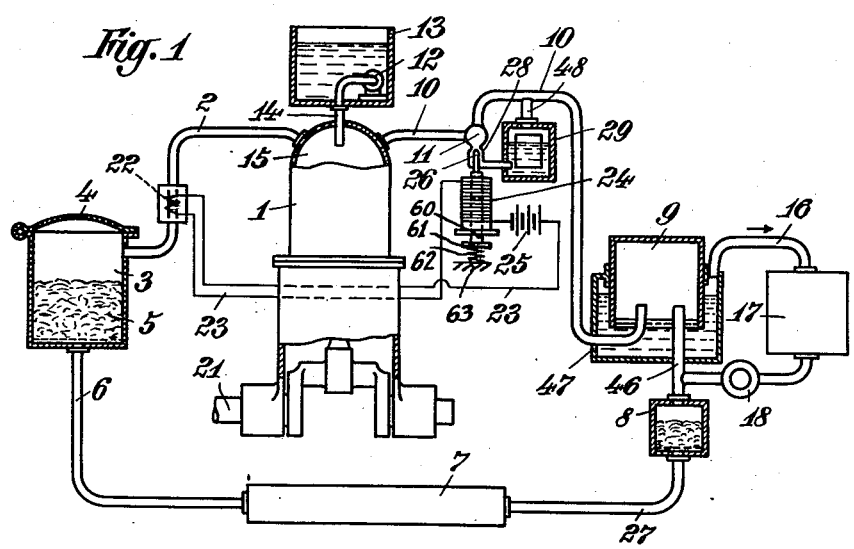

Oct. 15, 1935.   F. VON OPEL   2,017,481
CLOSED CYCLE INTERNAL COMBUSTION ENGINE AND METHOD OF OPERATING SAME
Filed April 19, 1932   2 Sheets-Sheet 1

Inventor:
Fritz von Opel
By
Attorney

Oct. 15, 1935.   F. VON OPEL   2,017,481
CLOSED CYCLE INTERNAL COMBUSTION ENGINE AND METHOD OF OPERATING SAME
Filed April 19, 1932   2 Sheets-Sheet 2
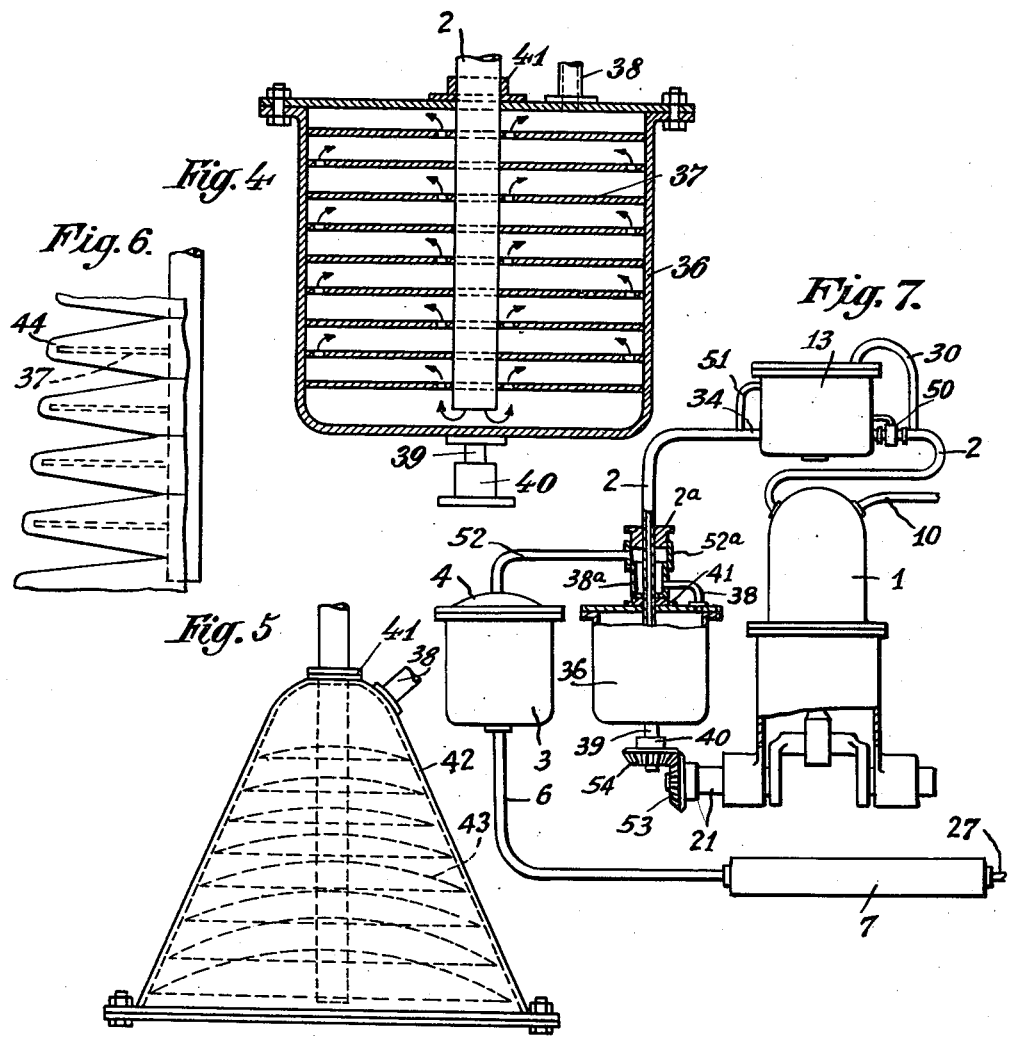
Inventor:
Fritz von Opel Patented Oct. 15, 1935

2,017,481

UNITED STATES PATENT OFFICE 2,017,481

CLOSED-CYCLE INTERNAL COMBUSTION ENGINE AND METHOD OF OPERATING SAME

Fritz von Opel, Russelsheim-on-the-Main, Germany

Application April 19, 1932, Serial No. 606,261
In Germany April 28, 1931

4 Claims.  (Cl. 123—1)

My invention relates to closed-cycle internal combustion engines and to a method of operating same.

Closed-cycle engines are those in which the exhaust is not discharged into the ambient air, and fresh air for combustion drawn into the engine, but in which the exhaust is returned to the engine after having been purified, cooled and mixed with liquid oxygen and fuel.

Engines of the type referred to are required if fresh air for combustion is not available, as in submarines, or if the air is much rarefied, as in aircraft at high altitudes.

Where the weight must be considered, as in airplanes, the oxygen should be carried in liquid condition. It is known that the reservoirs for liquid oxygen, which must be heat-insulated, are very light while steel flasks for carrying gaseous oxygen are very heavy on account of the high pressure of the gas.

In the operation of closed-cycle engines as performed heretofore, the liquid oxygen is injected into the cylinder at the end of the compression stroke, at the same time as the fuel, or after the fuel has been injected. The liquid oxygen is evaporated and the temperature of the compressed fuel mixture is lowered. The liquid heat and the major portion of the heat of evaporation are wasted.

It is an object of my invention to provide an improved method of operating closed-cycle internal combustion engines with oxygen which is stored in liquid condition.

To this end, in a closed cycle, I circulate a charge of inert gas in the engine and mix it with the exhaust of the engine and with oxygen. The oxygen is stored in liquid condition, for the reasons stated above, and is evaporated by the heat of combustion developed by the ignition of the combustible mixture in the cylinder, or cylinders, of the engine.

The evaporation of the oxygen by heat exchange with the heat of combustion may be effected in two ways, as will be fully described in the following specification.

The first way is preserving the oxygen in liquid condition until it is injected into the cylinder, or cylinders, of the engine after combustion of the combustible mixture therein. It is important that the oxygen is not present during the combustion, and not called upon to develop a portion, or all, of the heat of combustion. It is only injected after the combustion, for instance, immediately after the completion of the power stroke. In this manner, it does not develop heat but, on the contrary, abstracts heat from the products of combustion for its evaporation, cooling the products and the parts of the engine.

The second way is evaporating the oxygen by heat exchange with the exhaust outside the cylinder, or cylinders, of the engine, and injecting the vapor after the combustion, as described.

The oxygen, in liquid or evaporated condition, may be injected at any period during the cycle of the engine, provided it is injected after the combustion. Preferably, the injection is effected after the piston, or pistons, has performed its power stroke, but I am not limited to any definite period of injection, provided the above condition of timing it with respect to the combustion, is fulfilled.

It has already been proposed to admix oxygen, or some other gas, to the cycle of an internal combustion engine.

In the old methods referred to, the oxygen is either gaseous and does not require evaporation, or it is liquid, being present as a constituent of liquid air, and is forced into the combustion chamber of a cylinder where it is ignited so that, instead of being evaporated in heat-exchange with the heat of combustion, it is called upon to develop such heat itself. Firstly, therefore, the very efficient heat-exchange according to my invention is not accomplished in the old methods using a liquid gas as an admixture, and secondly it is a mistake to effect the ignition in the presence of a liquefied gas which, by its heat demand, lowers the temperature of ignition and combustion. According to my invention, as described, ignition and combustion are performed in the absence of the liquid oxygen.

While in the old methods the liquid heat and the major portion of the heat of evaporation are wasted, these drawbacks are eliminated according to my invention.

In my novel method, the heat of combustion is utilized but the temperature at which the combustion is performed, is not lowered. The heat of combustion may be utilized while the products of combustion are still present in the cylinder (first way) or after they have left the engine as exhaust (second way), for evaporating the liquid oxygen while cooling the products, and the parts or pipe lines of the engine, and extra means for heating the oxygen and for cooling the exhaust, are dispensed with.

As mentioned, the liquid or evaporated oxygen may be injected at any time during the cycle, after combustion.

The heat of evaporation for the liquid oxygen is withdrawn from the hot products of combustion, cooling the mixture of exhaust and vehicle, and cooling also the cylinder walls.

If the cooling by heat exchange with the liquid oxygen is not sufficient, the hot mixture is conducted through a cooler which, in the case of an airplane, is preferably a radiator in a wing of the plane.

Cooling the exhaust by heat-exchange with the liquid oxygen has the following other advantages:

The condensable oxygen combinations are eliminated from the hot mixture in liquid condition.

The pressure against which the oxygen pump delivers, is low.

The oxygen pump may be dispensed with altogether by conducting the exhaust, or a portion thereof, through the liquid oxygen. By the heat thus transferred to the oxygen, the latter is partly evaporated and its pressure may be utilized for injecting the oxygen into the mixture of exhaust and vehicle.

In the last-mentioned case, the oxygen combinations are separated in frozen condition and are easily removed.

In the accompanying drawings, two types of engines in which my process may be performed, and various accessories, are illustrated more or less diagrammatically by way of example.

In the drawings

Figure 2:
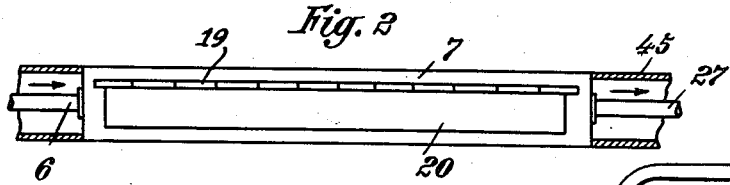
Figure 3:
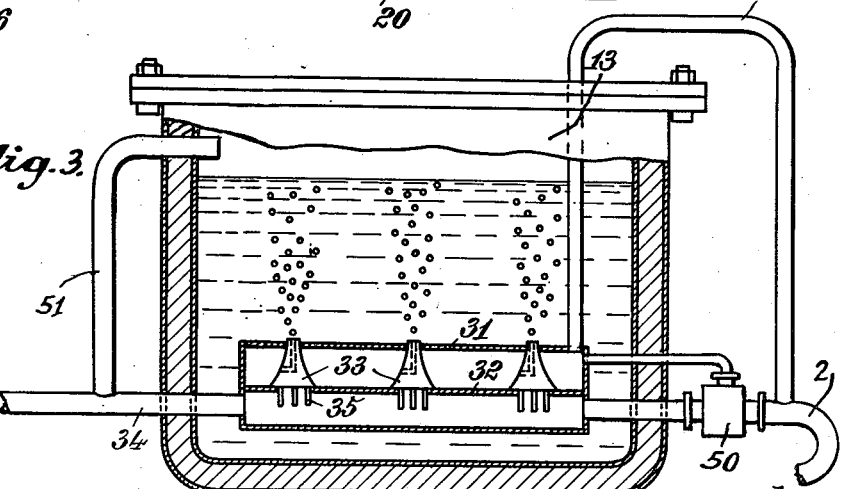

Fig. 1 is a partly sectional elevation of a complete engine of the first type in which, in accordance with the first way, see supra, the oxygen is injected in liquid condition, Fig. 2 shows its exhaust cooler, drawn to a larger scale, Fig. 3 is a section of an oxygen evaporator, Figs. 4 and 5 illustrate two types of condensate separators, Fig. 6 shows part of a third separator type, and Fig. 7 is a diagrammatic view of a part of an engine of the second type in which, in accordance with the second way, see supra, the oxygen is evaporated before being injected, this engine including the devices of Figs. 3 and 4.

Referring now to the drawings, and first to Figs. 1 and 2, 1 is the cylinder of the engine of the first type, with a combustion chamber 15, 10 is the inlet, and 2 is the exhaust pipe of the engine. The exhaust pipe 2 is connected to an exhaust purifier 3 which is filled with chemicals 5 for absorbing obnoxious products or residues of combustion, such as carbon monoxide or dioxide. The purifier is designed as a safety device, with a movable lid 4 or yielding walls, or other means which may give in the case of an explosion. The partly purified and cooled exhaust is conducted to a cooler 7 through a pipe 6 and from the cooler 7 to a "chemical accumulator" 8. This is a regulating appliance filled with chemicals which absorb oxygen from the gas if it has too high a percentage of oxygen, and yield the absorbed oxygen to the gas if the oxygen percentage is too low.

If the engine forms part of an airplane flying at high altitude, the cooler 7 is preferably arranged within one of the wings. Its most favorable position is at the leading edge of the aerofoil of which the cooler may form a part. The gas is effectively cooled by the relative wind moving along the wing while in turn the cooler yields a portion of its heat to the wing so that ice incrustation is prevented or reduced. It is desirable that the cooler 7, like the purifier 3, should be a safety device, and to this end it may be equipped with a flap or damper 20 which turns about a pivot 19, Fig. 2, and is normally closed by springs or other means (not shown) but yields if the pressure in the system oversteps a given limit.

A portion of a wing is indicated in section at 45 in Fig. 2.

From the accumulator or regulator 8, a vertical pipe 46 extends into an air vessel 47. 9 is an inverted bell in the air vessel the lower edge of which is immersed in liquid. The upper end of pipe 46 opens into the bell 9, and the inlet pipe 10 is connected to the interior of the bell 9 at its lower end. 11 is a carburetter which is connected to the pipe 10, 26 is a needle valve in the carburetter nozzle 28, 29 is a float tank which supplies fuel to the nozzle 28, and 48 is a pipe connecting the top of the float tank 29 to the intake pipe 10, 24 is a coil the core of which is connected to the needle valve 26, 22 is a temperature-responsive safety device in the pipe 2, 25 is a battery, and 23 is the circuit of the battery and the safety device 22.

The "safety device" 22 consists of a resistance coil which is wound around the exhaust pipe. The size of the resistance agrees with the amount of the current from the battery 25 and the magnetic coil 24 of the needle valve 26. This needle valve 26 consists of iron and it has a lower part 60 of brass. A plate 61 is secured to the lowest part of the section 60 against which one end of a spring 62 bears, the other end pressing against a rigid abutment 63. As seen in Fig. 1 the needle valve 26 will be closed by the spring 62, the more so as the current flowing in the coil 24 becomes weaker. This current, however, becomes weaker dependent upon the amount of the resistance in the coil 22, that is, the hotter the temperature in the pipe 2 the higher the resistance in the coil 22.

16 is a pipe connected to the top of the air vessel 47, 17 is a storage tank connected to the other end of pipe 16, and 18 is a pump the suction pipe of which is connected to the storage tank while its delivery pipe is connected to the pipe 46.

13 is a vessel for the reception of liquid oxygen which is arranged above the cylinder 1, 12 is a pump arranged below the liquid level in the tank 13 and operated from the engine by any suitable means, not shown, and 14 is the delivery pipe of the pump 12 which opens into the combustion chamber 15.

In operation, the closed circuit of the engine including its combustion chamber 15, is filled with an inert gas such as nitric oxide, nitrogen, etc. When the engine is started, the pump 12 injects oxygen into its combustion chamber 15, and when the percentage of oxygen in the inert vehicle has attained a given predetermined amount, the carburetter 11 is started by any suitable automatic means, not shown, fuel is admixed to the mixture of vehicle and oxygen, and the engine starts operating.

The mixture in the combustion chamber is ignited by any suitable means, not shown, and, after combustion, liquid oxygen is injected in order to cool the products of combustion and to reduce their volume. The oxygen itself is evaporated by the heat of combustion. Injection, as mentioned, may be effected at any time during the cycle, provided it occurs after the combustion, so that the temperature of the products of combustion is not lowered while the combustion is going on. This method embodies the "first way", as set out above. The mixture of vehicle and exhaust is conducted to the purifier 3 past the safety device 22. The object of the safety device and the coil 24 is to regulate the amount of fuel supplied per stroke in conformity with the normal condition of the engine. Variations in the temperature of the exhaust cause a corresponding variation in the fuel percentage of the combustible mixture.

The purifier 3 which, as mentioned, is preferably designed as a safety device, contains chemicals 5 for absorbing obnoxious constituents of the circulating mixture, for instance, carbon monoxides and dioxides. Preferably chemicals such as used in submarines are placed in the purifier 3 which give off oxygen while absorbing carbon dioxide. Under certain conditions, alkali lyes may be employed. If hydrogen is used as the fuel instead of carbon, the chemicals 5 are hygroscopic, or the water is separated by mechanical means such as will be described with reference to Figs. 4 to 6, and admixed to the circulating cooling water, or utilized for other purposes. If the fuel is alcohol, acetic acid may be released which should be neutralized by alkali, or in any other suitable manner, to eliminate its corrosive action.

The mixture of exhaust and vehicle which is now purified, partly cooled and provided with a certain percentage of oxygen from the chemicals 5 in the purifier 3, is conducted to the cooler 7 where its temperature is finally reduced, and to the regulator 8. Here, it meets chemicals which absorb excess oxygen from the circulating mixture if its percentage is too high, and deliver oxygen to the mixture if it is too low. The regulator makes up for irregularities of the oxygen supply from vessel 13, but to a limited extent only.

The "normalized" mixture now gets to the air vessel 47 where a supply of gas is stored in the tank 17. The object is to make up for variations in the pressure and the volume of the circulating mixture. The volume is by no means constant even under constant temperature conditions. On the one hand, it undergoes losses through leakage in the conduit, and particularly past the piston of the engine, and through partial combustion, and on the other hand its volume is increased by the products of combustion. If the volume increases the bell 9 is raised so that the surplus gas can escape past its lower edge and get into the storage tank 17. The gas leakage from the engine to the crank case or to any other point is collected by suitable means, not shown, and also conducted to the storage tank 17. If, for some reason, the volume or the pressure decreases in the system, the pump 18 is started by pressure-controlled means such as a diaphragm, not shown, and make-up gas is supplied to the circulating mixture. Instead of the pump 18, a pipe line, not shown, may be provided which is controlled by the diaphragm or the like.

The mixture which is now in proper condition, is admitted to the carburetter through intake pipe 10 where it atomizes the fuel from float tank 29, and the engine is ready for the next cycle and injection of liquid oxygen, as described. The carburetter may be of any suitable normal type but it is important that its float tank 29 should be connected to the pipe 10 by the pipe 48 in order to prevent variations of the fuel level if the pressure of the circulating mixture varies. The supply of fuel to the mixture is regulated in conformity with the temperature in pipe 2 by the safety device 22, as described.

It is preferred to arrange the oxygen pump 12 in the liquid oxygen, preferably on the bottom of the vessel 13, as shown in Fig. 1. It has been found that this is the only possibility of preventing temperature stresses in the pumps when handling liquids of very low temperature.

As mentioned, carrying the oxygen in liquid condition is favorable with respect to the saving in weight of the container for the oxygen but the formation of ice must be considered. Difficulties involved by such formation may be overcome in the method according to the "second way", see supra, by performing the heat exchange between the liquid oxygen and the exhaust in the vessel 13 itself, as will now be described.

Referring now to Fig. 3, the vessel 13 has double walls, as is usual in vessels for storing liquid oxygen. 31 is a heater in the vessel, and 32 is a partition subdividing the heater into an upper and a lower compartment. Exhaust is admitted to the upper or nozzle compartment through a pipe 30, and the lower or heating compartment has pipes 34, 34 at opposite ends through which exhaust flows. The arrangement of the pipes with respect to the engine will be shown and described with reference to Fig. 7. 33 are nozzles, here shown as tapered members, with their bases secured to the partition or heating plate 32, and their tops presented to the oxygen. Each nozzle has a bore in the shape of the letter L, the exhaust entering the horizontal branch of each bore, and leaving the nozzle at the upper end of its vertical branch. The exhaust permeates the oxygen in the tank 13 in the shape of bubbles and yields its heat to it while the oxygen is evaporated. In this manner, exactly as in the method of the "first way", the heat of combustion which is stored in the products of combustion, is utilized for the evaporation, the only difference being that now the heat exchange occurs after the products of combustion have left the engine, and have become exhaust. The evaporated oxygen is injected into the combustion chamber 15 of the engine, or into its carburetter 11, under its own vapor pressure, or by means of a pump. 35 are ribs projecting from each nozzle 33 into the heating compartment below the partition 32. The ribs increase the heat transfer from the exhaust in the heating compartment to the nozzles.

The constituents of the exhaust which are frozen out, float on the surface of the oxygen where they are easily removed. If it is desired to make up the vehicle in the manner described, the constituents are not frozen out completely but a portion is preserved in unfrozen condition and replaces the medium which has been tapped.

The elimination of condensate is important in many cases, and particularly for the operation of closed-cycle engines, not only because some condensates, such as water and carbon dioxide, are present in such quantities that they interfere with the operation of the engine but also because many condensates, such as the condensates from oil or fuel vapors, form explosive mixtures with oxygen.

Suitable separators will now be described.

Referring now to Fig. 4, 36 is a separator tank which is here shown surrounding the lower end of pipe 2, Fig. 1. The tank is a cylinder, and the pipe 2 is arranged axially therein and extends to a short distance above its bottom. 37 are annular baffle plates intermediate the pipe 2 and the wall of the tank, with perforations arranged alternately near the wall of the tank, and near the pipe 2. In this manner the gas from the pipe moves through the tank in a meandering path of great length. The tank may be equipped with a journal 39 at its lower end in a step bearing 40, and rotate at high speed. The speed of the condensate particles is obviously highest near the wall of the tank where the particles are abruptly deflected and centrifugal action is a maximum.

To facilitate the separation, the tank 36 is preferably cooled. Cooling may be effected in various ways, for instance, by the relative wind of air craft.

Rotation may be imparted to the tank 36 from the crank shaft 21 of the engine, as will be described with reference to Fig. 7.

The design of the tank may be modified in various ways. Thus, Fig. 5 shows a tapered tank 42. In a tank of this type, the centrifugal action increases as the diameter becomes larger from the top of the tank to its base.

Fig. 6 shows a tank 44 which is subdivided into as many units as there are baffles 37, i. e., each unit or compartment has a baffle of its own, and the cooling area of the tank is much increased by such subdivision.

In Figs. 4 and 5, 38 is the outflow pipe. A suitable arrangement for a rotary tank is as follows: The pipe 2 is the shaft about which the tank rotates and which supplies the gas, as shown in Fig. 4. This pipe is fixed, and arranged coaxially within it is a tubular shaft to which the tank is secured and to which the discharge pipe 38 is connected. 41 is a packing for the pipe.

The baffles may also be modified. Thus, instead of flat baffles 37 as shown in Fig. 4, the baffles may be dished and inverted, as shown in Fig. 5 at 43. This facilitates the downflow of the condensate in countercurrent to the ascending gas. Obviously, such dished baffles may also be provided in the cylindrical tank 36, Fig. 4. For facilitating the assembling and disassembling of the separator, in a tank such as shown in Fig. 5 or 6, the radial size of the baffles may be so determined that they bear on the inner face of the wall of the tank under resilient pressure, as shown in Fig. 4.

A tank for liquid oxygen which may be used for the method of the "second way" has already been described with reference to Fig. 3. The combination of such a tank 13 with an engine substantially as shown in Fig. 1, but with the parts at the right of Fig. 1 omitted for the sake of simplicity, is illustrated in Fig. 7. 2 is again the exhaust pipe of the engine but it is arranged differently, so that the exhaust gases, through the pipe 2, are directed into the container 31 through the pipe 34. 50 is a valve which normally breaks the connection of pipes 2 and 34, and a pipe 39 is connected to the pipe 2 ahead of the valve 50. When the valve 50 is open, the gases, as shown in Fig. 3, flow through the nozzles 33 and from there it bubbles through the fluid oxygen, and it leaves the container by means of the pipe 51, which is in communication with the pipe 2. From the continuation of pipe 2 at the other end of pipe 34 the gases are directed to a separator tank 36, as described with reference to Fig. 4, and after being treated therein to remove the fluid or solid constituents of the gases, they leave the separator tank 36 through the pipe 38 and by means of the pipe 52 enter the container 3. The separator 36 is rotatably mounted and it receives its rotation by means of bevel gears 53 and 54 from the crank shaft 21, or by any other suitable means, not shown. The separator 36 rotates and the pipe 38 rotates with it while the pipes 2 and 52 are stationary. The pipe 38 is connected to a sleeve 38a which surrounds the pipe 2, above the packing 41, and is sealed with respect to the pipe. The sleeve 38a partakes in the rotation of the tank 36 and at its upper end opens into a stationary sleeve 52a which is connected to the pipe 52 and sealed by a gland 2a on the pipe 2 at its upper end. The gases pass from tank 36 to sleeve 38a through pipe 38, from the sleeve 38a which, as mentioned, rotates with the tank 36 and its pipe 38, to the stationary sleeve 52a, and to pipe 52. The pipe 34 which communicates with the pipe 2 at both ends is usually closed by means of the pressure valve 50. Under these conditions, exhaust is admitted only to the upper compartment of heater 31 and bubbles up through the L-shaped bores of the nozzles 33. When the nozzles are obstructed by frozen water vapor or other matter which separates from the exhaust, the back pressure on the valve 50 rises and the valve opens to admit exhaust to the lower compartment of heater 31 until the ribs 35 will be heated, which will result in the thawing out of the nozzles.

I claim:

1. The method of operating internal combustion engines in a closed cycle with a charge of inert gas which circulates as the vehicle, comprising injecting liquid oxygen into the hot mixture of exhaust and vehicle after every power stroke of the engine.

2. The method of operating internal combustion engines in a closed cycle with a charge of inert gas which circulates as the vehicle, comprising injecting liquid oxygen into the hot mixture of exhaust and vehicle after every power stroke of the engine, purifying and cooling the mixture, and admixing fuel thereto.

3. In a closed cycle internal combustion engine, a cylinder, a pipe line connected to said cylinder for the circulation of an inert vehicle mixed with the exhaust of the engine, a vessel for liquid oxygen, and a pump in said vessel for injecting liquid oxygen into the mixture of exhaust and vehicle after every power stroke of the engine.

4. The method of operating internal combustion engines in a closed cycle with a charge of inert gas which circulates as the vehicle, comprising injecting liquid oxygen into the hot mixture of exhaust and vehicle after the combustion of the combustible mixture in the engine, purifying and cooling the mixture, and admixing fuel thereto.

FRITZ v. OPEL.